(12) United States Patent
Seo

(10) Patent No.: US 7,746,780 B2
(45) Date of Patent: Jun. 29, 2010

(54) ADAPTIVE ESTIMATION OF MULTIMEDIA DATA TRANSMISSION RATE IN A DATA COMMUNICATION SYSTEM

(75) Inventor: Kwang-Deok Seo, Gangwon-Do (KR)

(73) Assignee: LG Electronics Inc., Seoul (KR)

( * ) Notice: Subject to any disclaimer, the term of this patent is extended or adjusted under 35 U.S.C. 154(b) by 1378 days.

(21) Appl. No.: 11/186,116

(22) Filed: Jul. 20, 2005

(65) Prior Publication Data

US 2006/0018257 A1 Jan. 26, 2006

(30) Foreign Application Priority Data

Jul. 23, 2004 (KR) .................. 10-2004-0057737

(51) Int. Cl.
*H04L 12/28* (2006.01)

(52) U.S. Cl. ...................... 370/232; 370/252

(58) Field of Classification Search ............. 358/405; 709/232; 370/232, 241, 252
See application file for complete search history.

(56) References Cited

U.S. PATENT DOCUMENTS

| | | | |
|---|---|---|---|
| 2002/0004841 A1 | 1/2002 | Sawatari | |
| 2002/0118648 A1* | 8/2002 | Zaencker | 370/241 |
| 2002/0136162 A1 | 9/2002 | Yoshimura et al. | |
| 2003/0103243 A1 | 6/2003 | Watanabe et al. | |

FOREIGN PATENT DOCUMENTS

| | | |
|---|---|---|
| EP | 1 202 487 A2 | 10/2001 |
| JP | 2000-269975 | 9/2000 |
| JP | 2001251658 | 9/2001 |
| JP | 2001320440 | 11/2001 |
| JP | 20022042789 | 7/2002 |
| JP | 2004088746 | 3/2004 |
| KR | 2004-0020639 | 3/2004 |
| WO | 02/25878 | 3/2002 |
| WO | 03/001737 | 1/2003 |
| WO | WO 2004/040928 A | 5/2004 |

OTHER PUBLICATIONS

Victor. O.K. Li, et al., Internet Multicast Routing and Transport Control Protocols, Proceedings of the IEEE, Mar. 2002, vol. 90, Issue 3, p. 382, 383.

* cited by examiner

*Primary Examiner*—Ahmad F Matar
*Assistant Examiner*—Sonia Gay
(74) *Attorney, Agent, or Firm*—Lee, Hong, Degerman, Kang & Waimey

(57) ABSTRACT

A method for adaptively estimating a transmission rate of multimedia data by monitoring an RTCP network state is provided. The method comprises receiving a real-time transport protocol (RTCP) receiver report packet from a multimedia data reception unit; detecting packet loss rate from the RTCP receiver report packet; and adaptively estimating an available transmission rate according to a range within which the packet loss rate belongs.

16 Claims, 5 Drawing Sheets

ADAPTIVE ESTIMATION OF MULTIMEDIA DATA TRANSMISSION RATE IN A DATA COMMUNICATION SYSTEM

CROSS REFERENCE TO RELATED APPLICATIONS

Pursuant to 35 U.S.C. §119(a), this application claims the benefit of earlier filing date and right of priority to Korean Patent Application No. 2004-57737, filed on Jul. 23, 2004, the content of which is hereby incorporated by reference herein in its entirety.

FIELD OF THE INVENTION

The present invention relates to a multimedia data communication system based upon a real-time transport protocol over a real-time transport control protocol (RTP/RTCP) and, particularly, to a method for adaptively estimating a transmission rate of multimedia data by monitoring an RTCP network state.

BACKGROUND OF THE INVENTION

In general, conditions such as sufficient bandwidth, a small delay and a small packet loss are needed to successfully transmit multimedia data through a wired Internet protocol (IP) network. Unfortunately, the current network layer in the related art wired IP networks cannot provide a function suitable to meet quality of service (QoS) required for video transmission. Therefore, the QoS should be secured by a higher layer of the network layer. To this end, a real-time transport protocol (RTP) and a real-time transport control protocol (RTCP) on a transport layer have been proposed.

The RTP is an Internet protocol for real-time multimedia data such as real-time audio and video. Although the RTP does not ensure real-time transmission of data, using the RTP, application programs for transmission/reception in a real-time multimedia data communication system can support streaming data. The RTP is commonly executed over user datagram protocol (UDP).

The RTCP is a protocol used to maintain the QoS of the RTP. While the RTP is related to data transmission, the RTCP relates to monitoring of the data transmission and the transmitting of session-related information. RTP nodes send RTCP packets to one another, in order to analyze a network state and to periodically report whether the network is congested.

By the use of the RTP and the RTCP, network characteristics related to time limits in transmitting multimedia data may be considered. Accordingly, packet losses generated in the network may be remedied.

In a general multimedia data communication system, a multimedia application program (application layer) detects the network state through the RTCP and controls an encoding rate of real-time multimedia data to be transmitted. The controlling of the encoding rate of the real-time multimedia data is made through transmission rate control.

A general method of estimating an effective transmission rate by using network state information by the RTCP is provided in Equation 1.

$$R(t) = \frac{1.22 \times s}{RTT(t) \times \sqrt{p(t)}}$$ (Equation 1)

The R(t) indicates an effective transmission rate, the p(t) indicates a packet loss rate and is obtained by the RTCP transmitted from a receiving side. The RTT(t) indicates a round-trip delay time, and the 's' indicates size of a packet.

When the round-trip delay time (RTT(t)) and the packet loss rate (P(t)) are given, an effective transmission rate is estimated by Equation 1. When the packet size 's' is fixed, the estimated transmission rate varies according to the RTT(t) and P(t).

FIG. 1 shows a change in an available transmission rate estimated by Equation 1, when the P(t) and the packet size 's' are fixed and the RTT(t) is linearly changed. When the packet loss rate is fixed such that p(t)=0.015 and s=625 and the RTT(t) is linearly increased from 80 ms to 380 ms, the minimum transmission rate is 50 kbps and the maximum transmission rate is 500 kbps.

As shown in FIG. 1, as the RTT(t) increases, the estimated available transmission rate decreases. FIG. 2 shows a change in an available transmission rate estimated by Equation 1, when the RTT(t) and the packet size 's' are fixed and the P(t) is linearly changed. When the RTT(t) is fixed to 100 ms, the packet size 's' is fixed to 625 and the P(t) is changed from 0.1% to 20%, the minimum transmission rate of the user is 50 kbps and the maximum transmission rate is 500 kbps.

As shown in FIG. 2, in the related art method for estimating an effective transmission rate according to Equation 1, a time out occurs when large packet losses are not accounted for. That is, when the packet loss rate is small, the available transmission rate is estimated at an appropriate value according to the related art. However, if the packet loss rate is large, the available transmission rate is overestimated.

For example, when the packet loss rate is 10% (considerably large) the available transmission rate is undesirably overestimated at about 200 kbps by the related art estimation method of the transmission rate. Thus, the general estimation method of the related art rate is disadvantageous in that the available transmission rate is overestimated when the packet loss rate is large and the network congestion cannot be quickly resolved due to the above inaccuracies.

A solution is needed to overcome the above stated problem.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an adaptive estimation method of multimedia data transmission rate is provided.

The method, in accordance with one embodiment, comprises receiving a real-time transport protocol (RTCP)

receiver report packet from a multimedia data reception unit; detecting packet loss rate from the RTCP receiver report packet; and adaptively estimating an available transmission rate according to a range within which the packet loss rate belongs.

The available transmission rate is estimated according to a range within which the packet loss rate belongs. The estimating may comprise one or more processes such as estimating the available transmission rate according to a first equation, when the packet loss rate is in a first range; estimating the available transmission rate according to a second equation, when the packet loss rate is in a second range; and estimating the available transmission rate according to a third equation, when the packet loss rate is in a third range.

In one embodiment, the first equation is:

$$R_1(p(t_n)) = \frac{1.22 \times s}{RTT(t_n) \times \sqrt{p(t_n)}}$$

wherein S=packet size, RTT(tn)=Round-Trip delay Time, and P(tn)=packet loss rate detected from nth RTCP receiver report (RR) packet.

In another embodiment, the second equation is:

$$R2(p(tn)) = \frac{s \times 20 \times (1 - \alpha \times p(t_n))}{LSR(t_n) - LSR(t_{n-1})} + \beta$$

wherein S=packet size, P(tn)=packet loss rate detected from nth RTCP receiver report (RR) packet LSR(tn)=transmission time of nth RTCT sender report (SR) packet, and α,β=weight factors.

In some embodiments, the third equation is based on a minimum transmission rate assigned by a user and the first range is approximately 5% or less, the second range is between approximately 5% and approximately 10%, and the third range is approximately 10% or more, for example.

One RTCP sender report packet is transmitted every time a predetermined number of RTP packets are transmitted. One RTCP receiver report packet is received, every time a predetermined number of RTP packets are transmitted. The predetermined number is approximately 20 in one embodiment of the invention.

The RTCP receiver report packet may comprise a reception report block for reporting to multimedia data transmission unit statistical information of RTP packets transmitted from the multimedia data transmission unit. The reception report block comprises a packet loss rate and a transmission time of the last RTCP sender report packet.

In accordance with another aspect of the invention a transmission unit for adaptively estimating a transmission rate of multimedia data in an RTCP network is provided.

The transmission unit comprises a compression domain comprising a video encoder; and a video compression unit in communication with the video encoder; a transport domain comprising a transmission rate control unit; a RTP layer supporting communication with the transmission control unit; a UDP layer supporting communication with the RTP layer; and an IP layer supporting communication with the UDP layer over the IP layer.

The transmission unit receives a real-time transport protocol (RTCP) receiver report packet from a multimedia data reception unit, detects packet loss rate from the RTCP receiver report packet; and adaptively estimates an available transmission rate according to a range within which the packet loss rate belongs.

In one exemplary embodiment, the available transmission rate is adaptively estimated according to:

$$R(t_n) \equiv \begin{cases} R_1(p(t_n)) = \dfrac{1.22 \times s}{RTT(t_n) \times \sqrt{p(t_n)}} & (p(t_n) \leq 1st.Threshold) \\ R_2(p(t_n)) = \dfrac{s \times 20 \times (1 - \alpha \times p(t_n))}{LSR(t_n) - LSR(t_{n-1})} + \beta & (1st.Threshold < p(t_n) < 2nd.Threshold) \\ R_3(p(t_n)) = MinimumRate(ex.50kbps) & (p(t_n) > 2nd.Threshold) \end{cases}$$

wherein S=packet size, P(tn)=packet loss rate detected from nth RTCP receiver report (RR) packet LSR($t_n$)=transmission time of $n^{th}$ RTCT sender report (SR) packet, and α,β=weight factors. Approximately, the first threshold may be 5% and the second threshold may be 10%, for example.

The accompanying drawings, which are included to provide a further understanding of the invention and are incorporated in and constitute a part of this specification, illustrate embodiments of the invention and together with the description serve to explain the principles of the invention.

BRIEF DESCRIPTION OF THE DRAWINGS

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
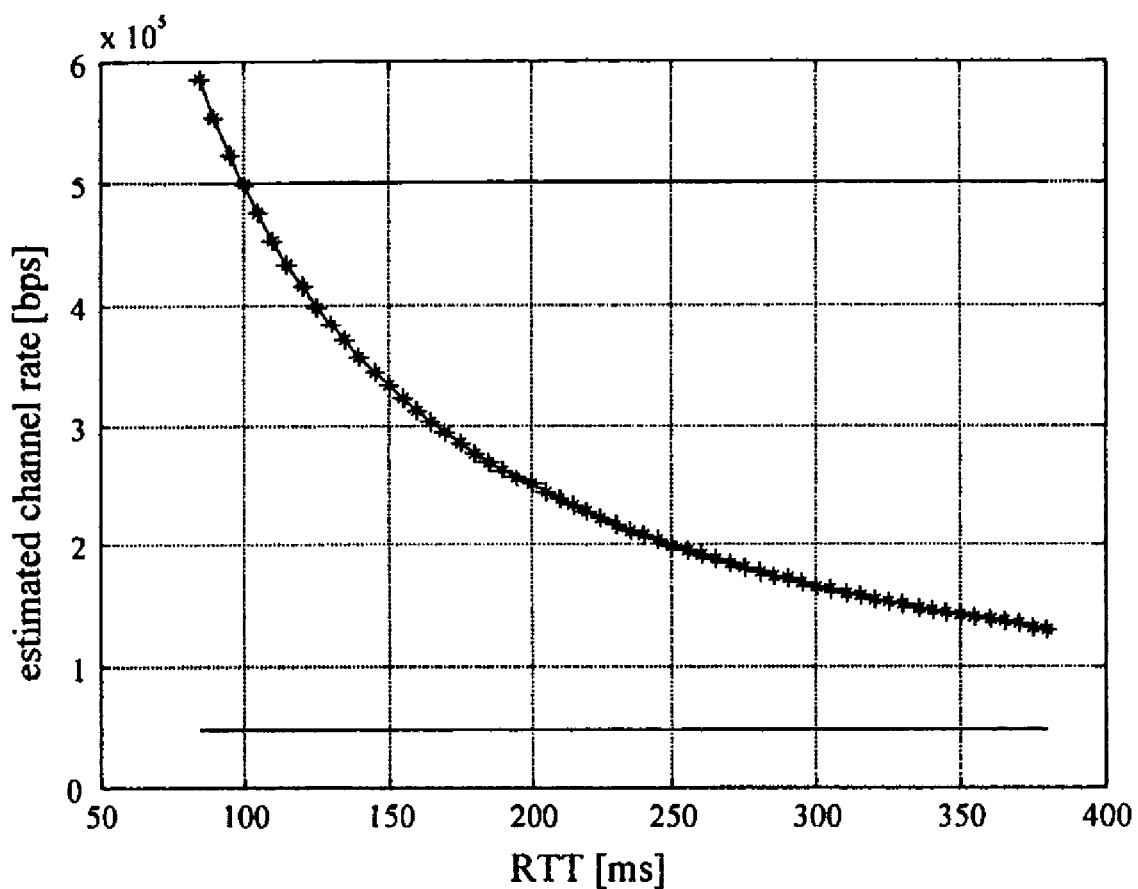
FIG. 1 illustrates a change in an available transmission rate estimated by a general estimation method when a packet loss rate is fixed and a round-trip delay time is linearly changed.
Figure 2:
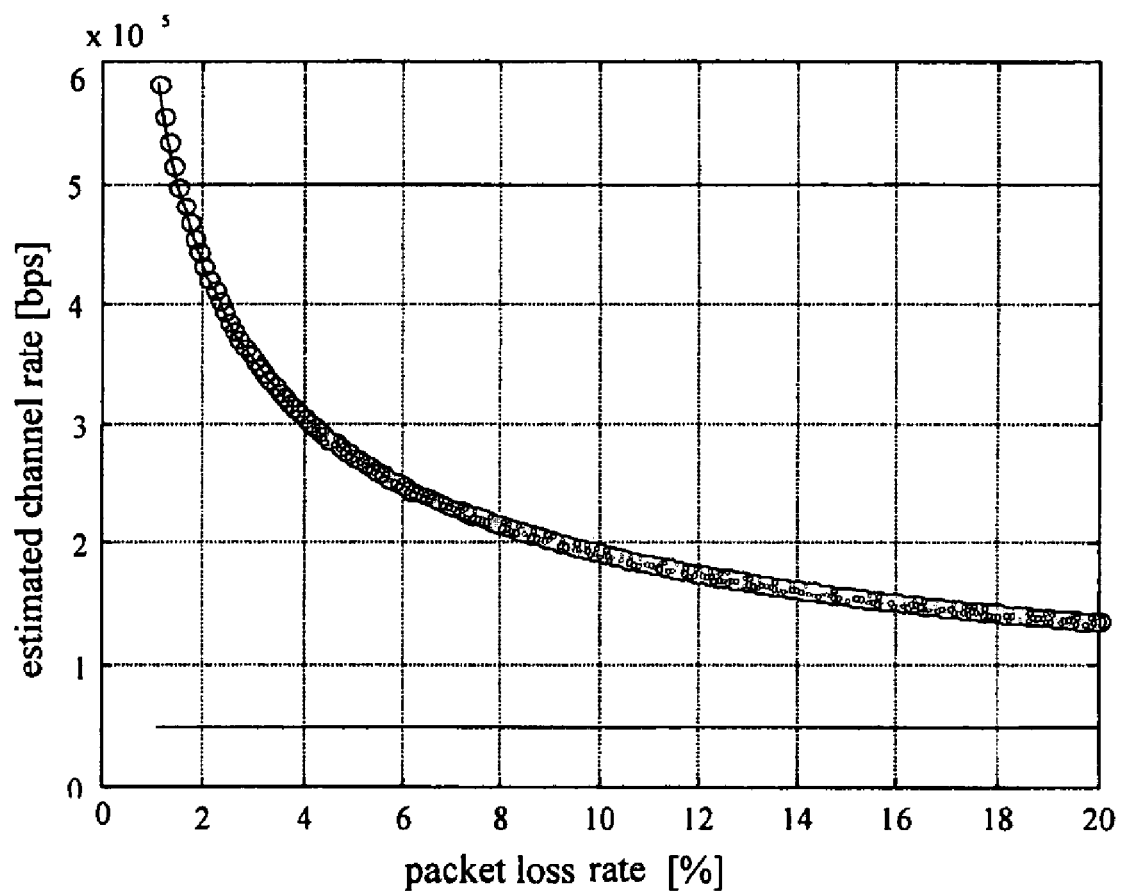
FIG. 2 illustrates a change in an available transmission rate estimated by a general estimation method when the round-trip delay time is fixed and the packet loss rate is linearly changed.
Figure 3:
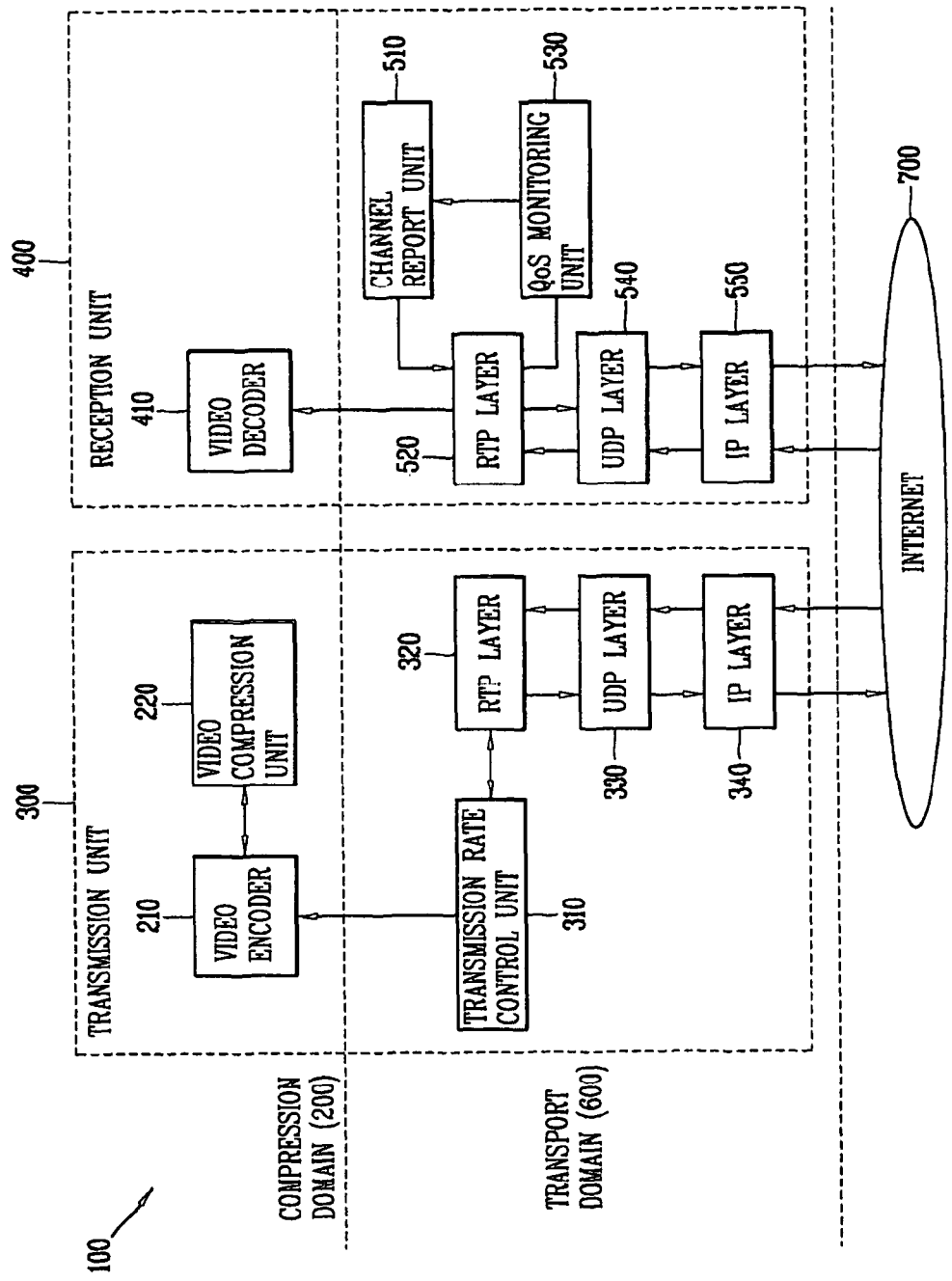
FIG. 3 illustrates configuration of a real-time multimedia data communication system over RTP/RTCP, according to one embodiment of the invention.

Referring to FIG. 3, a transmission unit 300 and a reception unit 400 of a real-time multimedia data communication system 100 are provided. Each unit is divided into transport and compression domains (respectively 200 and 600) included in an application layer of the communication network, in accordance with one embodiment.

The compression domain 200 of the transmission unit 300 comprises a video encoder 210 which encodes multimedia data according to an estimated transmission rate and a video compression unit 220 which compresses the encoded multimedia data. The transport domain 600 of the transmission unit 300 comprises a real-time transport protocol layer (RTP layer) 320 controlling transport of multimedia data from the video compression unit 220.

A UDP (user datagram protocol) layer 330 and an IP (Internet protocol) layer 340 for communicating with the reception unit 400 are also provided in preferred embodiments. The multimedia data is transported from the RTP layer 320. A transmission rate control unit 3 10 is connected to the RTP layer for detecting a packet loss rate from a RTCP receiver report (RR) packet transmitted from the reception unit 400.

In one embodiment, a round-trip delay time (RTT) is measured by using the RTCP RR packet, for example. Preferably, the transmission rate is estimated by using the packet loss rate and the RTT. The estimated transmission rate is provided to the video encoder 210 in accordance with one aspect of the invention.

The transport domain of the reception unit 400 may comprise an IP layer 550, a UDP layer 540, a RTP layer 520 for controlling transport of multimedia data transmitted to the UDP layer 540. A service quality monitoring unit 530 monitors QoS of multimedia data through information included in a header of a RTP packet of the RTP layer.

In one embodiment, a channel report unit 510 is included for reporting to the transmission unit 300 the information as related to QoS. The channel report unit 510 transmits the channel information to the transmission unit side through a RTCP RR packet, for example.

The RTCP RR packet comprises a reception report block sent to the transmission unit 300 that comprises the statistical information of RTP packets transmitted from the transmission unit 300. The reception report block further comprises a packet loss rate and a LSR (Last SR timestamp). The LSR indicates a transmission time of the last RTCP sender report (SR) packet.

The compression domain 200 of the reception unit 400 comprises a video decoder 410, which decodes multimedia data transmitted from the RTP layer. The multimedia data packet transmitted by the transmission unit 300 of the multimedia data communication system 100 may be lost or not timely delivered due to excessive time delays over the network. Packets that arrive at the reception unit on time are transmitted to the video decoder 400 via the IP/UDP/RTP layers and are decoded.

In a preferred embodiment, the reception unit 400 receives the multimedia data packet and gathers information about the network state based on information included in the RTP header of the multimedia data packet. The gathered information may include packet loss rate, communication delay and other network communication related parameters that can be used to monitor QoS of the communication network.

The gathered information is provided to the transmission unit 300 through a RTCP of the channel report unit 510. The transmission unit 300 predicts the available bandwidth of an available channel based on the gathered information and the predicted available bandwidth.

In one embodiment, the available transmission rate is transmitted to the video encoder 210. The video encoder 210 having received the predicted available transmission rate controls the output encoding rate of a multimedia data bit stream according to the predicted transmission rate.

Preferably, the transmission rate is estimated based on information included in a RR packet, when a transmission unit 300 receives a RTCP RR packet from a reception unit 400 in the multimedia data communication system 100.

In an exemplary embodiment, one RTCP packet is transmitted every time a predetermined number of multimedia data packets of a RTP packet format are transmitted. The predetermined number may be 20 or another number depending on implementation. Hereafter, the predetermined number 20 is used, by way of example, without limiting the scope of the invention to other possible implementations.

Figure 4:
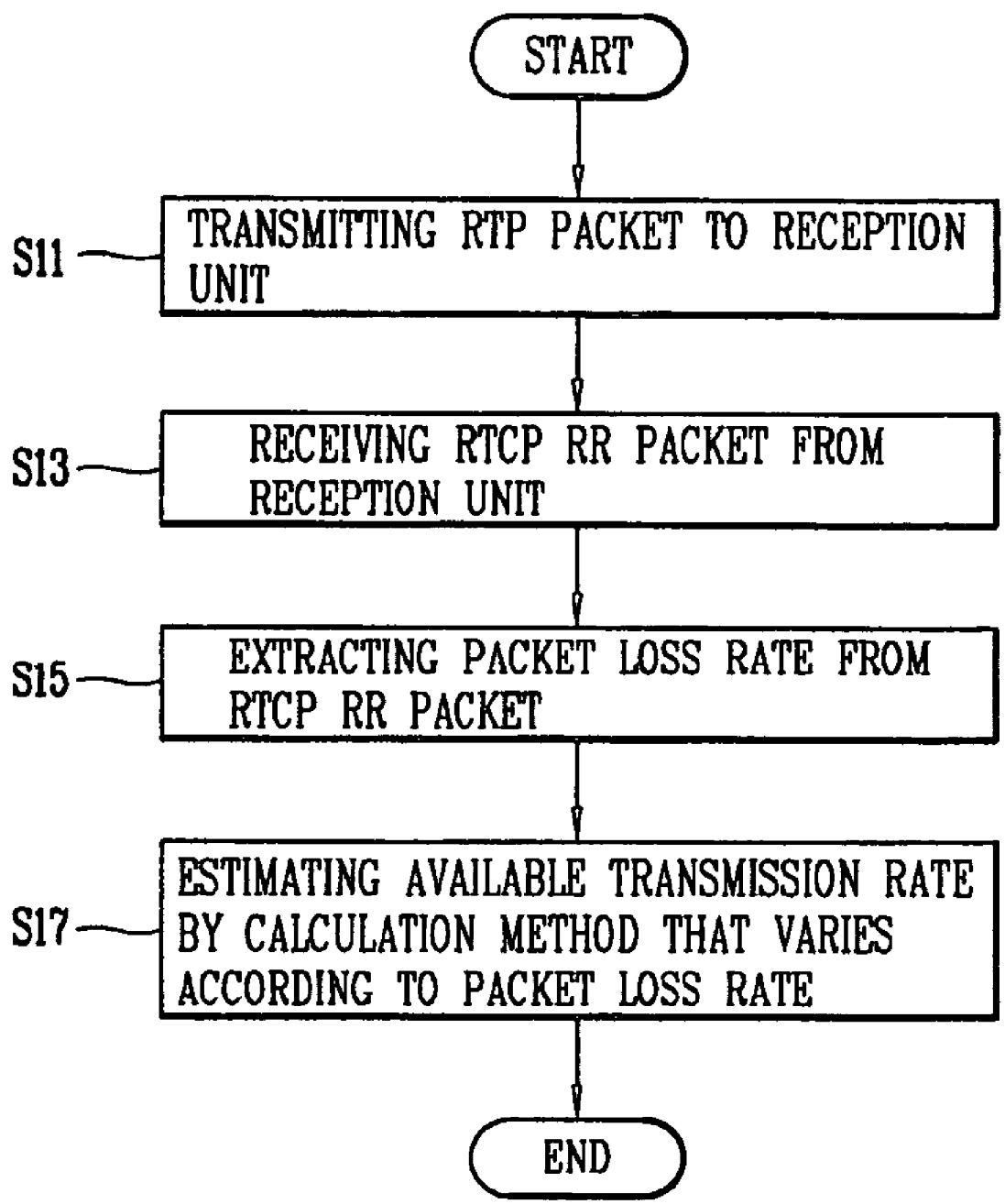
FIG. 4 illustrates an adaptive estimation method of transmission rate of multimedia data in accordance with one embodiment of the present invention.

Referring to FIG. 4, the transmission unit 300 transmits multimedia data in RTP packet format to the reception unit 400 (S11). Preferably, one RTCP packet is transmitted every time a predetermined number (e.g., 20) of RTP packets are transmitted.

Accordingly, the transmission unit 300 transmits to the reception unit 400, one RTCP sender report (SR) packet every time it transmits 20 RTP packets, in an exemplary embodiment. The RTCP SR packet comprises information related to a transmission time of a SR packet, such as the value of a NTP (network time protocol) time stamp at the time of SR packet transmission.

When receiving the RTCP SR packet, the reception unit 400 obtains a transmission time of the SR packet based on the NTP time stamp value of the RTCP SR packet. The reception unit 400 records the obtained transmission time of the SR packet on a LSR field to generate a RTCP RR packet and transmits the generated RTCP RR packet to the transmission unit 300.

The RTCO RR packet comprises a packet loss rate. The transmission unit 300 having received the RTCP RR packet (S13) extracts a packet loss rate from the RTCP RR packet (S15) and estimates an available transmission rate ($R(t_n)$) by a calculation method that varies according to the detected packet loss rate as provided in Equation 2.

$$R(t_n) \equiv \qquad\qquad\qquad\text{(Equation 2)}$$

-continued $$\begin{cases} R_1(p(t_n)) = \dfrac{1.22 \times s}{RTT(t_n) \times \sqrt{p(t_n)}} & (p(t_n) \leq 0.05) \\ R_2(p(t_n)) = \dfrac{s \times 20 \times (1 - \alpha \times p(t_n))}{LSR(t_n) - LSR(t_{n-1})} + \beta & (0.05 < p(t_n) < 0.1) \\ R_3(p(t_n)) = MinimumRate (ex. 50kbps) & (p(t_n) \geq 0.1) \end{cases}$$

Accordingly, the transmission unit 300 estimates an available transmission rate ($R_1(t_n)$) when the detected packet loss rate does not exceed a first threshold (e.g., $p(t_n) \leq 0.05$). The transmission unit 300 estimates an available transmission rate ($R_2(t_n)$) when the packet loss rate is greater than the first threshold and smaller than a second threshold (e.g., $0.05 < p(t_n) < 0.1$). The transmission unit 300 estimates an available transmission rate ($R_3(t_n)$) when the packet loss rate is not smaller than the second threshold (e.g., $p(t_n) \geq 0.1$).

In a preferred embodiment, when the detected packet loss rate does not exceed a first threshold (e.g., 5%), the transmission unit 300 estimates the available transmission rate ($R_1(t_n)$) by using Equation 1. When the detected packet loss rate is greater than the first threshold (e.g., 5%) and smaller than a second threshold (e.g., 10%), the transmission unit 300 estimates the available transmission rate ($R_2(t_n)$) by dividing the size of total data arriving in the reception unit 400 by a time required to transmit the packets (S17).

The time required to transmit 20 RTP packets, for example, is calculated by using a LSR value included in the RTCP RR packet. The transmission unit 300 subtracts a LSR value ($LSR(t_{n-1})$) of a previously received RTCP RR packet from a LSR value ($LSR(t_n)$) of the currently received RTCP RR packet, thereby obtaining the time required to transmit the RTP packets.

In one embodiment, the transmission unit 300 obtains a transmission time of the $n^{th}$ transmitted SR packet ($SR(t_n)$) based on the LSR value ($LSR(t_n)$) of the $n^{th}$ RR packet ($RR(t_n)$) and subtracts a transmission time of the $n-1^{th}$ SR packet ($SR(t_{n-1})$) from the transmission time of the $n^{th}$ SR packet ($SR(t_n)$), thereby obtaining a time required to transmit the RTP packets ($LSR(t_n) - LSR(t_{n-1})$).

The size of total data having normally arrived in the reception unit 400 is calculated as follows in accordance with one aspect of the invention. The transmission unit 300 checks the number of RTP packets having been normally transmitted between the transmission time of the $n-1^{th}$ SR packet ($SR(t_{n-1})$) and the transmission time of the $n^{th}$ SR packet ($SR(t_n)$) and calculates the size of the data by using the number of the transmitted RTP packets. The number of RTP packets normally transmitted during an interval between the $n-1^{th}$ SR packet ($SR(t_{n-1})$) and the $n^{th}$ SR packet ($SR(t_n)$) is $s \cdot 20 \cdot (1-p(t_n))$, for example.

The $p(t_n)$ indicates a packet loss rate detected from the $n^{th}$ RTCP RR packet, and the 's' indicates the packet size. The $\alpha$ and $\beta$ in Equation 2 are weighting factors given to allow transmission rates estimated by different equations to have continuous values without great differences therebetween when the packet loss rates are, for example, between 5% and 10%.

The $\alpha$ and $\beta$ may be calculated by using three expressions in Equation 2 when the packet loss rate of the RTCP RR packet transmitted from the reception unit is 5% and the packet loss rate of the RTCP RR packet is 10%, for example. Other packet loss rate may be selected in other embodiments of the invention.

If a time required to send the data is constant, the equation for estimating the available transmission rate ($R_2(t_n)$) is defined as a linear expression with respect to the packet loss rate p. If the packet loss rate detected in the step S15 is not smaller than 10%, for example, the transmission unit estimates the available transmission rate ($R_3(t_n)$) at the minimum transmission rate set by a user.

Figure 5:
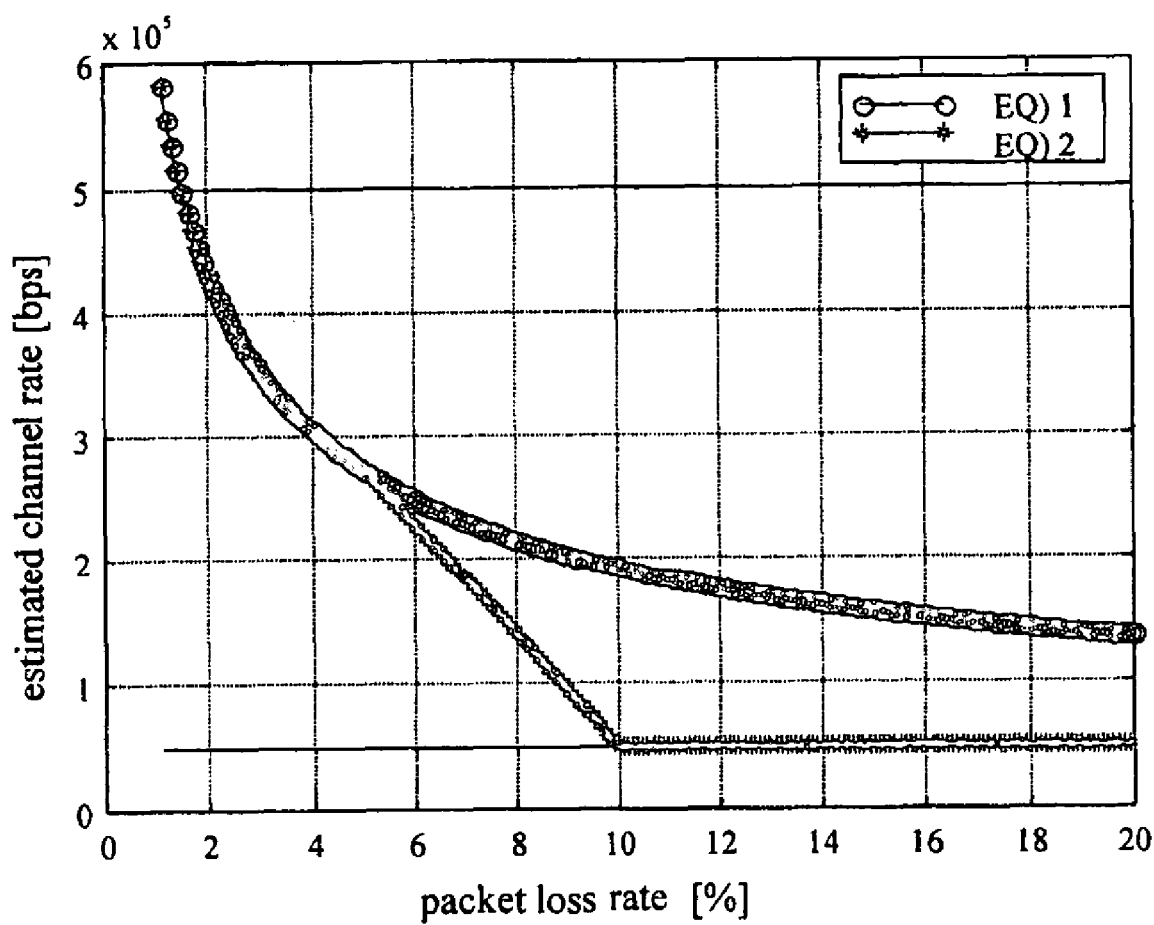
FIG. 5 illustrates transmission rate values estimated by a calculation method that varies according to the magnitude of the packet loss rate, in one embodiment.

FIG. 5 shows a graph of exemplary transmission rates estimated by a calculation method that varies corresponding to the magnitude of the packet loss rate in accordance with one embodiment of the present invention. Available transmission rates are estimated according to an increase in packet loss rate p when s=625, RTT=100 ms, and $LSR(t_n) - LSR(t_{n-1}) =$ RTT/2*20. In a preferred embodiment, $\alpha$ is equal to 44 and $\beta$ is equal to 395600, for example. It is noteworthy that in other implementation other sets of values may be used.

As shown in FIG. 5, the available transmission rate estimated by Equation 2 is the same as the resulting value of the Equation 1, when the packet loss rate does not exceed 5%. When the packet loss rate is greater than 5% and smaller than 10%, the available transmission rate estimated by Equation 2 is lower than the resulting value of the Equation 1, and when the packet loss rate is greater than 10%, the estimated available transmission rate is the minimum transmission rate as provided by the user. The threshold values of 5% and 10% disclosed herein are for the purpose of example. In alternate embodiments, other threshold values may be used instead.

Accordingly, a packet loss rate is detected from a RTCP RR packet transmitted from a reception unit and an estimation method of an available transmission rate is adaptively selected according to a range within which the detected packet rate falls. The available transmission rate is estimated at a smaller value when the packet loss is large. Thus, network congestion can be quickly resolved and reception quality of multimedia data due to the packet loss can be improved.

The embodiments described above are to be considered in all aspects as illustrative only and not restrictive in any manner. Thus, other exemplary embodiments, system architectures, platforms and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. An adaptive estimation method of multimedia data transmission rate, the method comprising:

receiving a real-time transport protocol (RTCP) receiver report packet from a multimedia data reception unit;

detecting packet loss rate from the RTCP receiver report packet; and adaptively estimating an available transmission rate according to a range within which the packet loss rate belongs;

wherein one RTCP sender report packet is transmitted every time a predetermined number of RTP packets are transmitted, wherein the estimating step comprises:

estimating the available transmission rate according to a first equation, when the packet loss rate is in a first range;

estimating the available transmission rate according to a second equation, when the packet loss rate is in a second range; and estimating the available transmission rate according to a third equation, when the packet loss rate is in a third range, wherein the second equation is:

$$R_2(p(t_n)) = \frac{s \times 20 \times (1 - \alpha \times p(t_n))}{LSR(t_n) - LSR(t_{n-1})} + \beta,$$

wherein:

S=packet size,

P($t_n$)=packet loss rate detected from $n^{th}$ RTCP receiver report (RR) packet, LSR($t_n$)=transmission time of $n^{th}$ RTCP receiver report (RR) packet, and α, β=weight factors.

2. The method of claim 1, wherein the available transmission rate is estimated according to a range within which the packet loss rate belongs.

3. The method of claim 1, wherein the first equation is:

$$R_1(p(t_n)) = \frac{1.22 \times s}{RTT(t_n) \times \sqrt{p(t_n)}},$$

wherein:

S=packet size,

RTT($t_n$)=Round-Trip delay Time, and

P($t_n$)=packet loss rate detected from $n^{th}$ RTCP receiver report (RR) packet.

4. The method of claim 1, wherein the third equation is based on a minimum transmission rate assigned by a user.

5. The method of claim 1, wherein the first range is approximately 5% or less.

6. The method of claim 1, wherein the second range is between approximately 5% and approximately 10%.

7. The method of claim 1, wherein the third range is approximately 10% or more.

8. The method of claim 1, wherein one RTCP receiver report packet is received, every time a predetermined number of RTP packets are transmitted.

9. The method of claim 1, wherein the predetermined number is approximately 20.

10. The method of claim 8, wherein the predetermined number is approximately 20.

11. The method of claim 1, wherein the RTCP receiver report packet comprises:

a reception report block for reporting to multimedia data transmission unit statistical information of RTP packets transmitted from the multimedia data transmission unit.

12. The method of claim 11, wherein the reception report block comprises a packet loss rate and a transmission time of the last RTCP sender report packet.

13. A transmission unit for adaptively estimating a transmission rate of multimedia data in an RTCP network, the transmission unit comprising:

a compression domain comprising:

a video encoder; and a video compression unit in communication with the video encoder; and a transport domain comprising:

a transmission rate control unit;

a RTP layer supporting communication with the transmission control unit;

a UDP layer supporting communication with the RTP layer; and an IP layer supporting communication with the UDP layer over the IP layer, wherein:

the transmission unit receives a real-time transport protocol (RTCP) receiver report packet from a multimedia data reception unit, detects packet loss rate from the RTCP receiver report packet; and adaptively estimates an available transmission rate according to a range within which the packet loss rate belongs, and the available transmission rate is adaptively estimated according to:

$$R(t_n) \equiv \begin{cases} R_1(p(t_n)) = \dfrac{1.22 \times s}{RTT(t_n) \times \sqrt{p(t_n)}} & (p(t_n) \leq 1st.Threshold) \\ R_2(p(t_n)) = \dfrac{s \times 20 \times (1 - \alpha \times p(t_n))}{LSR(t_n) - LSR(t_{n-1})} + \beta & (1st.Threshold < p(t_n) < 2nd.Threshold) \\ R_3(p(t_n)) = MinimumRate(ex.50kbps) & (p(t_n) > 2nd.Threshold) \end{cases}$$

wherein:

S=packet size,

P($t_n$)=packet loss rate detected from $n^{th}$ RTCP receiver report (RR) packet, LSR($t_n$)=transmission time of $n^{th}$ RTCP receiver report (RR) packet, and α, β=weight factors.

14. The transmission unit of claim 13, wherein the first threshold is approximately 5%.

15. The transmission unit of claim 13, wherein the second threshold is approximately 10%.

16. The transmission unit of claim 13, wherein the first threshold is 5% and the second threshold is 10%.

* * * * *